United States Patent
Lengsfeld et al.

(10) Patent No.: US 9,044,905 B2
(45) Date of Patent: Jun. 2, 2015

(54) FORMING DEVICE FOR MANUFACTURING PROFILED SEMIFINISHED PRODUCTS, SYSTEM WITH SUCH A FORMING DEVICE AND METHOD FOR MANUFACTURING PROFILED SEMIFINISHED PRODUCTS

(75) Inventors: Hauke Lengsfeld, Helmste (DE); Christian Lübbering, Gründendeich (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 465 days.

(21) Appl. No.: 12/919,535

(22) PCT Filed: Feb. 27, 2009

(86) PCT No.: PCT/EP2009/001411
§ 371 (c)(1), (2), (4) Date: Dec. 23, 2010

(87) PCT Pub. No.: WO2009/106340
PCT Pub. Date: Sep. 3, 2009

(65) Prior Publication Data
US 2011/0121479 A1 May 26, 2011

Related U.S. Application Data

(60) Provisional application No. 61/031,833, filed on Feb. 27, 2008.

(30) Foreign Application Priority Data
Feb. 27, 2008 (DE) .......... 10 2008 011 411

(51) Int. Cl.
B29C 35/00 (2006.01)
B29C 70/52 (2006.01)

(52) U.S. Cl.
CPC .......... B29C 70/52 (2013.01); B29C 70/526 (2013.01); B29C 70/521 (2013.01); B29C 70/523 (2013.01); B29C 2791/008 (2013.01)

(58) Field of Classification Search
CPC .... B29C 70/52; B29C 70/527; B29C 70/528; B29C 2791/008; B29C 35/0261; B29C 47/0014

USPC .......... 264/68, 640, 641, 642, 643, 645, 639, 264/241, 299, 316, 442, 443, 444, 45.1, 264/45.8, 46.1, 69, 70, 71, 72, 503, 165, 264/172.19
See application file for complete search history.

(56) References Cited

U.S. PATENT DOCUMENTS

| 3,556,888 A | 1/1971 | Goldsworthy |
| 3,992,240 A | 11/1976 | Kuehn, Jr. |

(Continued)

FOREIGN PATENT DOCUMENTS

DE 49677 A1 4/1965

(Continued)

OTHER PUBLICATIONS

International Search Report for corresponding PCT Application No. PCT/EP2009/001411, Feb. 12, 2010.
International Preliminary Report on Patentability for corresponding PCT Application No. PCT/EP2009/001411, Sep. 7, 2010.

Primary Examiner — Stella Yi
(74) Attorney, Agent, or Firm — Ingrassia Fisher & Lorenz, P.C.

(57) ABSTRACT

Methods and apparatus for manufacturing a profiled semifinished fiber-reinforced composite (FRC) product from a semifinished product of dry fiber or prepreg material that is moved through a forming device in its longitudinal direction (L), where the semifinished product is moved between the facing forming contours of tool parts in the longitudinal direction of a forming device on a carrier foil and the forming contours of the cross sections of the tool parts continuously change from a cross-sectional contour in the entry region to a forming contour in the outlet region, where a supporting part in the intake region of the forming device is set in vibration in such a way that the semifinished product is transformed into a ductile state due to the frictional heat generated between the supporting part and the semifinished product, and where the speed of the movement of the semifinished product is controlled in dependence on the temperature of the semifinished product.

5 Claims, 3 Drawing Sheets

(56) References Cited

U.S. PATENT DOCUMENTS

| | | |
|---|---|---|
| 4,249,980 A * | 2/1981 | Shobert et al. ............... 156/441 |
| 4,780,166 A | 10/1988 | Hunter |
| 5,091,036 A | 2/1992 | Taylor |
| 5,098,496 A | 3/1992 | Breitigam et al. |
| 2001/0010248 A1 | 8/2001 | Vodermayer et al. |
| 2009/0071593 A1 | 3/2009 | Slaback et al. |

FOREIGN PATENT DOCUMENTS

| | | |
|---|---|---|
| DE | 4017978 A1 | 12/1991 |
| DE | 19754381 A1 | 6/1999 |
| FR | 1126040 A | 11/1956 |
| JP | 4308213 A | 10/1992 |
| WO | 0206037 A1 | 1/2002 |
| WO | 2007107007 A1 | 9/2007 |

\* cited by examiner

FORMING DEVICE FOR MANUFACTURING PROFILED SEMIFINISHED PRODUCTS, SYSTEM WITH SUCH A FORMING DEVICE AND METHOD FOR MANUFACTURING PROFILED SEMIFINISHED PRODUCTS

CROSS REFERENCE TO RELATED APPLICATIONS

This application claims priority to PCT Application No. PCT/EP2009/001411, filed Feb. 27, 2009; which claims priority to German Patent Application No. DE 10 2008 011 411.1, filed Feb. 27, 2008, and claims the benefit to U.S. Provisional Patent Application No. 61/031,833, filed Feb. 27, 2008, the entire disclosures of which applications are hereby incorporated by reference.

BACKGROUND

The invention pertains to a forming device for forming a plane semifinished product into a profiled semifinished fiber-reinforced composite (FRC) product or semifinished fiber-reinforced plastic (FRP) product, to a system for manufacturing a profiled semifinished fiber-reinforced composite (FRC) product with such a forming device, and to a method for manufacturing a profiled semifinished FRC product that is moved through a forming device in its longitudinal direction.

The semifinished product used for the device and the method is a fabricated product for fiber-reinforced components such as, e.g., prepregs, blended fabrics, webs prepared with the film stacking method, fabrics or fiber layers that are impregnated or coated with a resin or combinations thereof. The semifinished product being manufactured may consist of a finished FRC component that is assembled with other components or the semifinished product may consist of a preform that [text missing] another processing step, e.g., a forming step or a hardening step.

A pultrusion method is a continuous pull-extrusion method, in which semifinished products in the form of fibers or bonded fabrics are formed into a profiled part. The fibers or the bonded fabrics can be wetted with a liquid plastic upstream or in a pultrusion tool. Subsequently, the fabric webs and the fibers are formed into the desired shape of the profiled part with the aid of a pultrusion tool such as, for example, a mould core or the like. For the hardening process, the formed fibers and fabric webs are heated by means of a heating unit. The at least partially hardened profiled part then passes through a drawgear, by means of which the profiled part is continuously withdrawn. The profiled part can ultimately be sawn into individual parts.

WO 02/06037 describes a pultrusion head for mounting in a pultrusion machine for continuous processing of long fibre composite profiles.

In U.S. Pat. Nos. 5,091,036, 5,098,496 and 3,992,240 apparatuses and methods for pultruding thermoplastic, fibrous structures are described.

From DE 40 17 978 A1 a device and a method for manufacturing profiled parts made of prepregs is known.

DE 4017978 A1 describes a device for manufacturing profiled parts (profiles PR) from thermoplastic semifinished products with a two-part or multipart moulding press, the parts of which form a heating zone (HZ), a pressing zone (PZ) and a cooling zone (KZ), wherein the shape of the gap formed by the parts of the moulding press continuously changes from the initial profile (rectangular cross section) to the desired profile (PR).

DE 19754381 A1 discloses a method for manufacturing a profiled part, particularly a pultrusion method, in which a plurality of fibers and/or one or more fabric webs is/are continuously wetted with a liquid plastic and moulded in accordance with the profiled part, wherein the fibers and/or the fabric webs and/or the liquid plastic is/are subjected to a vibration in order to dissolve bubbles or defects in the fibers and/or the fabric webs and/or the intermediate spaces. The fabric webs are unwound from rolls or the like and fed to a connecting device. The fibers are also fed to this connecting device by means of other guiding devices. The fibers and the fabric webs are brought together and interlinked with the aid of the connecting device. The connected fibers and fabric webs are fed to a tool arranged downstream of the connecting device. This tool may consist, for example, of a mould core or the like. The fibers are moulded together with the fabric webs with the aid of the tool. The fibers and the fabric webs are, in particular, folded. The tool is realized in such a way that the desired shape of the profiled part is achieved after the moulding of the fibers and fabric webs.

WO 2007/107007 discloses a pultrusion device with three thermal zones that are thermally insulated from one another, wherein a pre-determined temperature profile is realized with said thermal zones in order to mould and subsequently harden a semifinished product being guided through the pultrusion device.

DE 40 17 978 A1 describes a device and a method for manufacturing profiled parts, in which a moulding press with a heating zone, a pressing zone and a cooling zone is utilized, wherein the shape of the gap formed by the parts of the moulding press continuously changes from the initial profile to the desired profile.

SUMMARY OF THE INVENTION

The invention aims to develop a forming device, a pultrusion system and a method for the cost-efficient manufacture of fiber-reinforced profiles with optimized quality.

According to the invention, this objective is attained with the characteristics of one or more embodiments disclosed and described herein. Other embodiments are also disclosed and described herein.

According to the invention, a forming device or a shaping tool or a pultrusion device for forming a plane semifinished product, i.e., a semifinished product that can be wound up or a band-shaped semifinished product, into a profiled semifinished fiber-reinforced composite (FRC) product is proposed, wherein the forming device features:

a lower tool part with a first forming surface and an upper tool part with a second forming surface that faces the first forming surface, wherein said forming surfaces form a pultrusion channel or channel, through which a semifinished product is moved in a feed direction, and wherein the contours of the cross sections of the forming surfaces that extend transverse to the feed direction of the semifinished product continuously change from a contour situated in the entry region of the forming device to a contour situated in the outlet region of the forming device such that the semifinished product moved through the forming device can be transformed from a first profile cross section into a nominal profile cross section in the outlet region, a heating unit that is arranged downstream of the entry region referred to the feed direction.

In this case, the forming device is provided, in particular, with a control unit that features an actuating device for adjusting the heating unit and is functionally connected to the heating unit arranged in the intake region, as well as to a temperature sensor arranged in the intake region in order to receive temperature values, wherein a functional module with a control function for controlling the temperature in the intake region is implemented in the control unit, and wherein said functional module determines actuating signals to be transmitted to the heating unit based on the temperature values and a nominal temperature in the entry region and transmits these actuating signals to the heating unit in order to adjust the temperature in the intake region.

The forming device may furthermore feature a drive unit for realizing a feed movement of the semifinished product (2) in the forming device (1). In this case, the control unit may be functionally connected to a drive unit for realizing a feed movement of the semifinished product (2) in the forming device (1), wherein the control unit determines actuating signals for the drive unit for realizing a feed movement of the semifinished product (2) in the forming device (1) based on the temperature values and a nominal temperature in the intake region and transmits these actuating signals to the drive unit.

According to another exemplary embodiment of the forming device, it features an adjusting unit and a servomotor that is coupled to the adjusting unit and can move at least one of the tool halves relative to the other tool half by exerting pressure in order to open and close the forming device such that the tool halves can operate as a pressing tool. In this case, the forming device may be provided, in particular, with a sensor for determining signals for the force, with which the tool parts are closed, and the functional module may be functionally connected to the sensor, wherein the functional module determines signals for actuating the servomotor of the adjusting unit based on nominal forces for closing the tool parts relative to one another and transmits these signals to the servomotor in order to maintain the nominal force within predetermined limits.

It would be possible, in particular, to provide the adjusting unit and a drive unit coupled to the adjusting unit or a servomotor or actuator that can move at least one of the tool halves relative to the other tool half by exerting pressure in order to open and close the forming device such that the tool halves can operate as a pressing tool. The control unit that is functionally connected to the drive unit coupled to the adjusting unit may feature, in particular, an interface for a drive unit for feeding the semifinished product to the forming device and a temperature sensor that is arranged in the intake region. A functional module, by means of which a temperature control can be realized in the intake region, may also be implemented in the control unit, wherein said functional module can also determine signals for opening and closing the forming device in dependence on the speed of the feed movement of the semifinished product and transmit the determined opening and closing commands to the drive unit.

The functional unit may feature a function for determining signals for the force, with which the tool parts are closed, and transmit the determined values for the force to the drive unit.

The heating unit of the forming device that is arranged in the intake region may consist, in particular, of a vibratory unit, by means of which a region of at least one forming surface can be set in vibration in order to heat the semifinished product by means of frictional heat.

The temperature sensor may consist of a pyrometer or a thermocouple.

The heating unit may alternatively or additionally feature an induction unit, by means of which the semifinished product can be heated.

The forming device may furthermore feature a second heating unit for a shaping region, as well as a third heating unit for a hardening region situated in the outlet region, wherein the shaping region is situated upstream of the hardening region referred to the feed direction, wherein a temperature sensor that is connected to the control unit is respectively arranged in the shaping region and in the hardening region, and wherein the functional module of the control unit features a temperature control and an actuation for the second and the third heating unit.

The adjusting unit may be designed in such a way that the position of the tool parts relative to one another can be adjusted in the closed position of the tool parts in order to vary the shape of the pultrusion channel.

In order to realize a discontinuous or quasi-continuous mode, the functional module of the control unit may in these embodiments alternatively or additionally feature a function, by means of which the tool parts are moved apart from one another and toward one another again at predetermined times or at times defined by the control unit, wherein the movement of the semifinished product is realized by actuating the drive unit while the tool parts are moved apart from one another and the movement of the semifinished product is stopped by actuating the drive unit while the tool parts are moved apart from one another.

The forming device may also feature guideways, by means of which lateral edge sections of the semifinished product can be guided at least in the region of the tool. In this case, the guideways may be arranged outside the tool.

According to the invention, a system for manufacturing a profiled semifinished fiber-reinforced composite (FRC) product from a semifinished product of dry fibers or prepreg material is furthermore proposed, wherein said system features a forming device according to the invention and a drive unit for feeding the semifinished product into the forming device.

According to the invention, a method for manufacturing a profiled semifinished fiber-reinforced composite (FRC) product from a semifinished product of dry fibers or prepreg material that is moved through a forming device in its longitudinal direction is also proposed. This method features the following steps:

moving the semifinished product between the facing forming contours of tool parts in the longitudinal direction of a forming device on a carrier foil, wherein the forming contours of the cross sections of the tool parts continuously change from a cross-sectional contour in the entry region to a forming contour in the outlet region, and vibrating a supporting part in the intake region of the forming device in such a way that the semifinished product is transformed into a formable state due to the frictional heat generated between the supporting part and the semifinished product, wherein the speed of the movement of the semifinished product is controlled in dependence on the temperature of the semifinished product.

In the inventive method, the tool parts may, in particular, be opened and returned to their forming distance again in a time intervals during the continuous movement of the semifinished product, wherein the opening and closing of the forming device is realized in dependence on the speed of the feed movement due to opening and closing commands of a control unit.

According to the invention, it would also be possible that the forming device is opened and closed with a predetermined pressure in dependence on at least one measured temperature due to opening and closing commands of a control unit, wherein the movement of the semifinished product is stopped in the closed state of the forming device. In this case, it would also be possible to control the temperatures in an intake zone, a principal shaping zone and a hardening zone in a time-dependent and/or temperature-dependent fashion while the movement of the semifinished product is stopped.

In the method according to the invention, it is generally possible to shape the semifinished product from an initial state into an omega profile (hat profile) during the movement through the forming device.

BRIEF DESCRIPTION OF THE DRAWINGS

Exemplary embodiments are described below with reference to the enclosed drawings, in which.

DETAILED DESCRIPTION OF THE INVENTION

Figure 1:
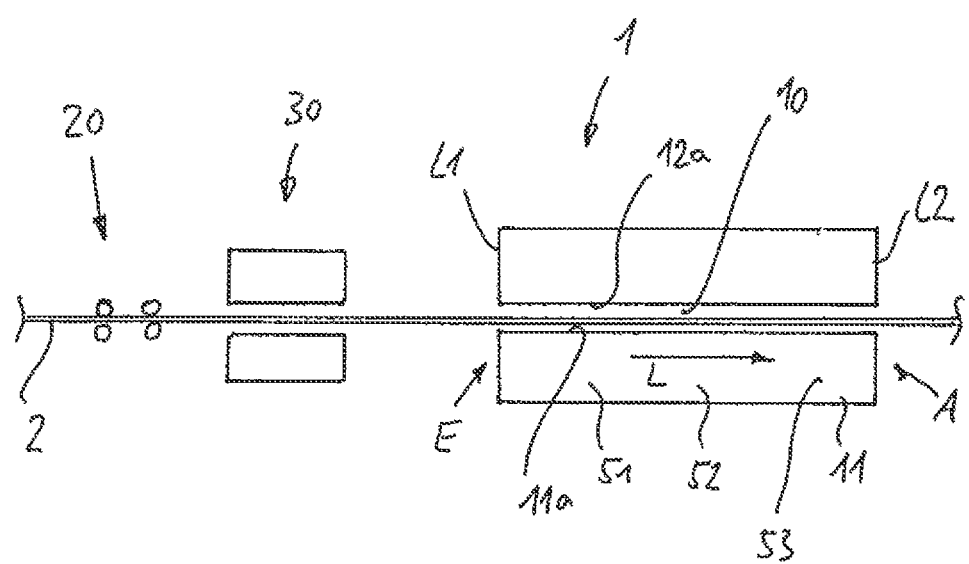
FIG. 1 shows a schematic representation of a system with a forming device for implementing the inventive method.
Figure 2A:
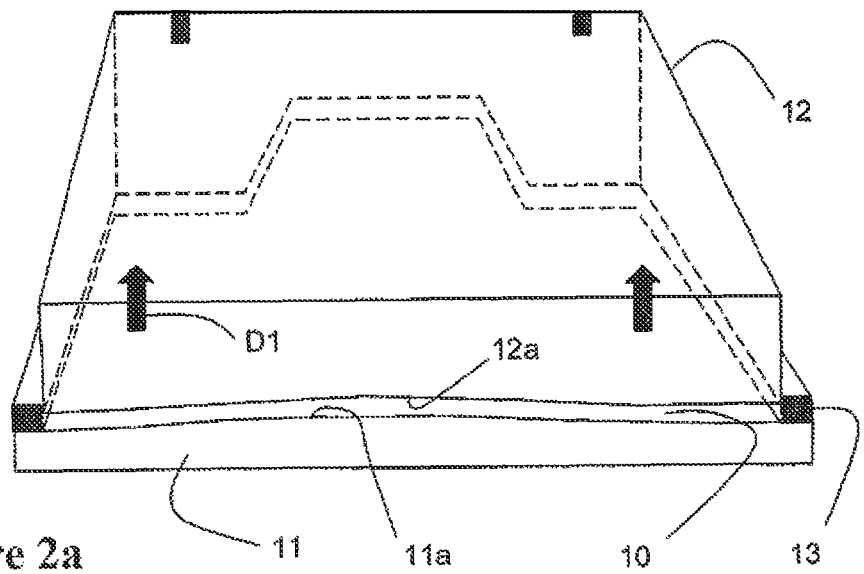
FIG. 2a shows a schematic perspective representation of an embodiment of the forming device or the pultrusion tool with a lower and an upper tool part, namely viewed in the longitudinal direction.
Figure 2B:
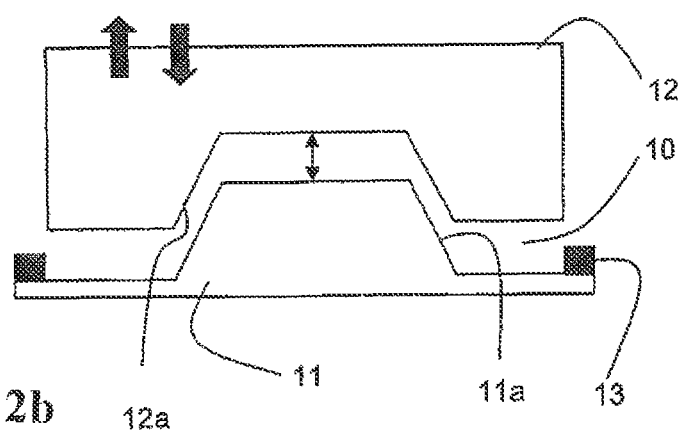
FIG. 2b shows a schematic cross-sectional representation of the embodiment of the forming device illustrated in FIG. 2a in the form of an oblique top view.
Figure 3:
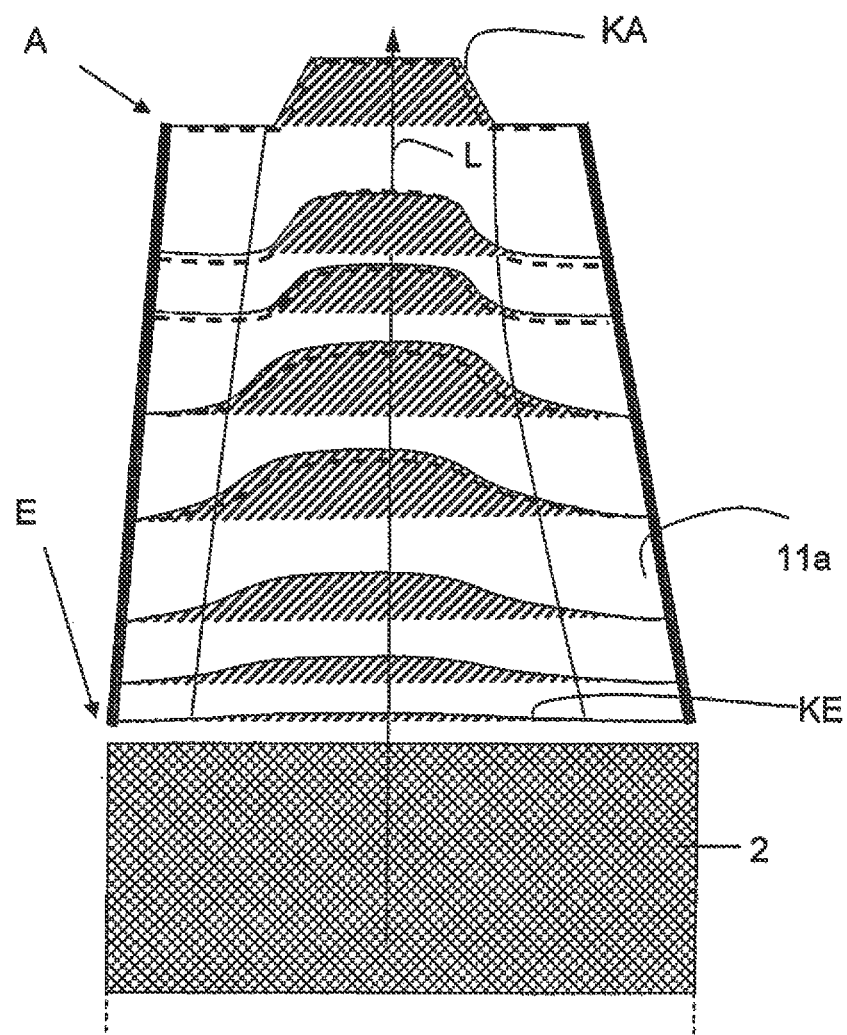
FIG. 3 shows a perspective representation of the lower tool part and the forming contours thereof in the form of an oblique top view.

According to the invention, a semifinished product 2 is guided in a feed direction V through a contour-shaping tool or a forming device 10 with an entry region 3 on an entry side L1 and an outlet region 4 on an outlet side L2 that is spaced apart from the inlet region in the longitudinal direction L such that the feed direction V accordingly extends in the longitudinal direction L of the forming device 1.

The forming device or the pultrusion device 1 forms part of a pultrusion system A and is composed of a lower tool part 11 with a first forming surface 11a and an upper tool part 12 with a second forming surface 12a that faces the first forming surface 11a. The contours of the cross sections of the forming surfaces 11a, 12a that extend transverse to the feed direction V continuously change from a contour KE in the entry region E to a contour KA in the outlet region A. The contours KE and KA of the forming surfaces 11a, 12a, as well as the continuous transition between these forming surfaces and therefore the shape of the mould core or pultrusion channel 10 formed by said forming surfaces when the forming device 1 is closed, are realized such that the semifinished product 2 is transformed from a first or initial profile cross section, with which the semifinished product 2 is fed to the forming device 1, into a nominal profile cross section, with which the semifinished product 2 is delivered to additional processing.

The tool halves 11, 12 can be moved toward one another in such a way that pressure is exerted by means of an adjusting unit and a drive unit coupled thereto such that the tool halves can operate as a pressing tool. The inventive forming device 1 therefore is realized in the form of a pressing-shaping tool.

The upper tool part preferably can be moved relative to the lower tool part in a translatory fashion. However, it would also be possible that the upper tool part can be spatially moved relative to the lower tool part. This makes it possible to adjust the dimension of the gap. This furthermore makes it possible to move the tool parts relative to one another, i.e., to open and close the tool parts, particularly during the pultrusion process, in order to support the transport process. It would also be possible to close the tool by applying a predetermined force in order to compress the semifinished product 2 guided through the forming device in a predetermined fashion.

In addition, the tool parts 11a, 12a may feature receptacle devices for receiving contour surface inserts on their facing sides such that exchangeable parts with differently forming contour surfaces or contours can be inserted into the forming device 1 in order to manufacture different types of profiles.

The semifinished product 2 used consists of a plane bonded fabric, i.e., a flat or band-shaped or mat-shaped bonded fabric, of dry fiber material or prepreg material. Rigid fibers with a high tensile strength, e.g., of amide, glass, carbon, silicone or graphite, may be considered as fibers in this case. When utilizing semifinished prepreg products i.e., semifinished products that are pre-impregnated with a matrix material, the textile fibers or bonded fabrics are already provided with matrix material. When utilizing a dry fiber material, it is provided with a matrix material before it is introduced into the forming device 1. In this case, it would be possible, e.g., to guide the dry fiber material through an impregnating bath with matrix material or to provide the dry fiber material with matrix material, e.g., by means of wetting or spraying. After the semifinished product passes through the forming device 1, the semifinished product 2 with the matrix material is hardened under the influence of suitable temperatures and/or suitable pressures. The fibers embedded in the matrix material cause a reinforcement of the composites to be manufactured. Thermosetting plastic materials such as unsaturated polyester resins (UP), epoxy resins (EP) or vinyl ester (VE) or thermoplastic materials such as polypropylene (PP), polyamide (PA) or polyetheretherketone (PEEK) may be used as matrix material.

The pultrusion system A features a drive unit 20 for supplying or for feeding the semifinished product 2 into the forming device 1. This drive unit may comprise a roller drive, in which rollers that rotate in opposite directions push the semifinished product 2 forward, i.e., in the direction of the forming device 1, wherein the contact pressure of the rollers, as well as the consistency of the rollers, are realized in such a way that slipping of the semifinished product is prevented during the feed thereof. In this case, it would be possible to provide driving rollers that are driven by a motor on one and/or both sides, i.e., rollers that are situated on both sides of the semifinished product to be driven. One or more rollers may be spring-loaded in order to continuously exert a predetermined contact pressure upon the semifinished product 2. The drive unit may be speed-controlled and/or power-controlled. The rollers may furthermore be realized such that they can be heated and/or cooled.

The drive unit 20 may also be realized in the form of a gripping mechanism. For example, this gripping mechanism may feature two grippers, wherein one gripper is respectively engaged with the semifinished product 2 in order to realize its forward movement while the other gripper is reset in order to reengage with the semifinished product 2 at a location situated opposite to the forward moving direction. It would also be possible to utilize more than two grippers in this case. Such a gripping mechanism can also be used in combination with the aforementioned roller drive.

A belt mechanism with two belts that carry along the semifinished product 2 during their movement and thusly move the semifinished product 2 forward may be alternatively or additionally utilized as drive mechanism. In this case, both belts or only one belt may be driven. The belts may be spring-loaded such that a predetermined contact pressure is exerted upon the semifinished product 2. The belts may also be coupled to a heating or cooling device in order to heat or cool at least one of the belts and to cause a temperature change of the semifinished product 2, particularly during its forward movement.

A feed control device may also be coupled to the drive unit in order to monitor, control or shift the speed of the semifinished product movement.

The pultrusion system A may optionally feature a device 30 for applying matrix material onto the semifinished product 2. In this case, the device 30 may consist of an impregnating bath, through which the semifinished product 2 is guided, a spraying device or a wetting device. When utilizing a spraying device or a wetting device, particularly the fibers, but alternatively or additionally also the fabric webs, are wetted with a liquid plastic or the matrix material. This may take place independently, for example, of the tool described below. However, this may alternatively or additionally also take place within this stool. The plastic may consist, for example, of epoxy resins, polyester, vinyl ester, acrylic or the like.

In addition, the pultrusion tool is realized with three different heating zones. For this purpose, the upper tool part 12 with the second tool contour surface is divided into three tool part sections 51, 52, 53 that are arranged successively in the longitudinal direction L.

The first tool part section 51, the second tool part section 52 and the third tool part section 53 respectively feature a first, a second and a third heating device, wherein the first heating device is situated in or downstream of the entry region E referred to the longitudinal direction and the third heating device is arranged in or upstream of the entry region E. The second heating device or the second tool part section 52 is situated between the first and the third heating device referred to the longitudinal direction L.

The first heating device is arranged in the intake region 51 situated at the entry region E. This first heating device is realized in such a way that it can transform the semifinished product into a ductile, plastic state. It may be realized in the form of a vibratory unit. For this purpose, a vibratory supporting part is arranged in the entry region E. The vibratory supporting part may be arranged on the first forming surface 11a and/or on the second forming surface 12a. The vibratory supporting part may also consist of a section 15 of the lower tool part 11 that extends in the longitudinal direction t and form a section of the first contour surface 11a that extends in the longitudinal direction L in this case. The vibratory supporting part may alternatively or additionally consist of a section 16 of the upper tool part 12 that extends in the longitudinal direction L and features a section of the first contour surface 11a that extends in the longitudinal direction L. Frictional heat is generated in the semifinished product due to the relative movement of the surface section and the surface section of the semifinished product lying thereon and/or due to the relative movement between the opposite surface of the respective tool part. According to the invention, the vibrations are realized in such a way that the semifinished product provided with matrix material is sufficiently heated for being transformed into a ductile state.

In an alternative embodiment, a vibratory plate may be placed onto the first forming surface 11a and/or the second forming surface 12a such that it can be moved relative thereto.

The at least one vibratory plate is motor-driven and realized in such a way that it can heat the semifinished product 2 to a temperature that lies above the melting temperature of the matrix material.

The advantage of this method can be seen in that a continuous march of temperature of the semifinished product 2 without temperature shocks is ensured.

The first heating device may alternatively or additionally consist of an induction coil that is arranged in the lower and/or upper tool part.

According to the invention, the second zone is the principal shaping zone. Accordingly, the second heating device is realized in such a way that the respective shaping temperature can be generated in the semifinished product. The second heating device may be arranged in the lower tool part and/or in the upper tool part and feature, for example, a heating gas device, an infrared radiator, a laser, a microwave or radiowave heater, an ultrasonic device and/or an induction coil.

An autoclave is integrated into the hardening zone 53 in order to harden the semifinished product in the hardening zone.

A temperature sensor with a temperature monitoring device is preferably provided in each zone. The monitoring of the process temperatures makes it possible, in particular, to optimize the quality of the semifinished product or component to be manufactured. This also makes it possible to carry out reproducible test runs by means of purposeful temperature monitoring.

The temperature sensor used may consist of a pyrometer (infrared thermometer) that measures the infrared energy emitted by the semifinished product 2 and is able to determine the temperature of the semifinished product 2 in this fashion.

The utilization of such a temperature sensor provides the advantage that the temperature measurements of the molten matrix are carried out in a contactless fashion such that adhesion of the matrix to the temperature sensor is prevented.

A thermocouple that features a measuring body with temperature-sensitive resistance characteristics may be alternatively or additionally used as temperature sensor, wherein the temperature is indirectly determined by means of a resistance measurement in this case. During the determination of the temperature of the semifinished product 2, an equalization of temperature differences between the measured temperature of the thermocouple and the temperature of the semifinished product matrix is carried out in a correction module with corresponding implemented functions. The utilization of these temperature differences leads to a time delay (low-pass characteristic) that is also taken into account in the correction module. However, the direct contact with the semifinished product needs to be accepted in this temperature equalization.

The forming device 1 is provided with a control unit that makes it possible to specify nominal temperatures and features a control device and a corresponding actuation of the heating devices, by means of which the nominal temperature of the heating devices can be specified and controlled.

The forming device 1 furthermore features an adjusting unit with a corresponding drive unit, by means of which the tool parts 11a, 12a can be opened (arrow D1) and closed relative to one another. The control unit may be functionally coupled to the drive unit such that the tool parts can be opened or closed relative to one another due to certain specifications. The opening and closing of the tool parts 11a, 12a may take place within predetermined time intervals, i.e., adjustable time intervals, or in accordance with other criteria. For example, a function may be implemented in the control unit that causes the tool parts to open and close when a predetermined temperature is reached in one or more heating zones 51, 52, 53.

According to the inventive method, the semifinished product 2 is fed to the pultrusion tool 10 in the form of a flat, band-shaped bonded fabric consisting of a dry fiber or prepreg material by means of the drive unit 20. In this case, the semifinished product 2 may be fed to the pultrusion tool 10 in the form of a layered structure or in individual layers. The material is drawn into the pultrusion tool on a carrier foil.

The section of the semifinished product situated in the intake region is heated by means of the first heating device, namely to a temperature, at which preliminary forming of the semifinished product 2 can take place to the extent, in which the contour of the tool parts 11, 12 changes referred to a longitudinal position on the moving semifinished product. The heating of the semifinished product 2 by means of the first heating device improves the shaping characteristics of the semifinished product 2.

The aforementioned section or location of the semifinished product 2 is additionally, pulled through the pultrusion tool such that the semifinished product with a flat profile cross section upstream of the entry region E is continuously formed into a semifinished product with a nominal profile.

The forming device 1 may operate in a continuous mode, in which the semifinished product 2 is continuously drawn in and shaped. The tool parts 11a, 12a may be statically positioned relative to one another in this case. Alternatively, it would be possible that the tool parts 11a, 12a open to such a degree that the transport and shaping process is simplified in the continuous mode. In this mode, the second and the third heating device remain at a shaping temperature. After the delivery of the formed semifinished product 2, its shape is preserved by means of a suitable method and it can be additionally processed, e.g., assembled with a component carrier or another component.

The opening and closing of the tool parts relative to one another may take place within regular time intervals that can be preset on a control unit or realized by means of a control with the aforementioned controlled variables.

The semifinished product 2 is guided in the forming device 1 by means of a guiding device 13. For example, lateral edge sections of the semifinished product are guided by means of the guideways arranged in the region of the tool or outside the tool.

The inventive forming device 1 may furthermore operate in a discontinuous or in a quasi-continuous mode. In this context, the term "quasi-continuous process" should be interpreted as a manufacturing method, in which the feed movement of the semifinished product is in fact stopped in time segments, particularly for carrying out a pressing process, but in which the semifinished product being processed is not removed from the system until the cutting process such that the method can also be considered to be "continuous" in this respect. In this case, the upper tool part 12a is raised within regular time intervals or in accordance with predetermined nominal values and the semifinished product 2 is guided in the forming device 1 step-by-step by means of the guiding device 13. The closing of the tool parts 11a, 12a is realized by generating a predetermined force such that the semifinished product is compressed to the predetermined degree when the tool parts 11a, 12a are closed. In this case, the intake region is heated to a pre-forming temperature, by means of which the semifinished product is heated to a shaping temperature, i.e., plasticized. Furthermore, the hardening zone 53 is heated to a hardening temperature such that the semifinished product slowly hardens in this zone. Consequently, the hardening takes place in the rear region of the forming device referred to the longitudinal direction L.

The invention claimed is:

1. A method for manufacturing a profiled semifinished fiber-reinforced composite product from a semifinished product of dry fiber or prepreg material, comprising:
   moving the semifinished product of dry fiber or prepreg material through a forming device in a longitudinal direction thereof,
   moving the semifinished product between facing forming contours of opposing tool parts in the longitudinal direction of the forming device on a carrier foil, where forming contours of cross sectional shapes of the tool parts continuously change from a cross-sectional contour in an entry region to a forming contour in an outlet region,
   vibrating a supporting part in an intake region of the forming device with a vibratory unit in such a way that the semifinished product is transformed into a ductile state due to frictional heat generated between the supporting part and the semifinished product,
   heating the semifinished product in a shaping region downstream from the intake region and upstream of a hardening region with a second heating unit such that the semifinished product reaches a shaping temperature sufficient to take on a contour imposed by the tool parts,
   heating the semifinished product in the hardening region downstream from the shaping region with a third heating unit such that the semifinished product reaches a hardening temperature sufficient to harden the semifinished product, the hardening region situated in the outlet region,
   transmitting actuating signals to the vibratory unit to adjust a temperature in the intake region based on a first temperature of the semifinished product measured by a first temperature sensor in the intake region, and
   controlling a speed of movement of the semifinished product through the forming device based on one or more of the first temperature, a second temperature of the semifinished product measured by a second temperature sensor in the shaping region and a third temperature of the semifinished product measured by a third temperature sensor in the hardening region as the semifinished product moves through the vibrating intake region, the shaping region, and the hardening region.

2. The method according to claim 1, further comprising opening and returning the tool parts to their forming distance in time intervals during a continuous movement of the semifinished product, wherein opening and closing of the forming device is realized in dependence on a speed of feed movement due to opening and closing commands of a control unit.

3. The method according to claim 1, further comprising:
   opening and closing the forming device with a predetermined pressure in dependence on at least one of the first temperature, the second temperature and the third temperature due to opening and closing commands of a control unit, and
   stopping the movement of the semifinished product in a closed state of the forming device.

4. The method according to claim 3, further comprising controlling the respective intake, shaping, and hardening in a time-dependent and/or temperature-dependent fashion while the movement of the semifinished product is stopped.

5. The method according to claim 1, further comprising shaping the semifinished product from an initial state into an omega profile (hat profile) during its movement through the forming device.

* * * * *